US008141883B2

(12) United States Patent
Hu et al.

(10) Patent No.: US 8,141,883 B2
(45) Date of Patent: Mar. 27, 2012

(54) SELF-LOCKING MECHANISM OF MANUALLY TIGHTENED DRILL CHUCK

(76) Inventors: Zhenqian Hu, Wuyi (CN); Luwen Zhang, Wuyi (CN); Youfeng Zhang, Wuyi (CN)

( * ) Notice: Subject to any disclaimer, the term of this patent is extended or adjusted under 35 U.S.C. 154(b) by 973 days.

(21) Appl. No.: 10/590,429

(22) PCT Filed: Apr. 14, 2006

(86) PCT No.: PCT/CN2006/000678
§ 371 (c)(1),
(2), (4) Date: May 28, 2008

(87) PCT Pub. No.: WO2007/118349
PCT Pub. Date: Oct. 25, 2007

(65) Prior Publication Data
US 2008/0231004 A1    Sep. 25, 2008

(51) Int. Cl.
*B23B 31/165*   (2006.01)
(52) U.S. Cl. .................... 279/62; 279/140; 279/902
(58) Field of Classification Search .............. 279/62, 279/125, 140, 902, 60, 61
See application file for complete search history.

(56) References Cited

U.S. PATENT DOCUMENTS

| | | | | |
|---|---|---|---|---|
| 2,768,832 A | * | 10/1956 | Smith | 279/16 |
| 5,741,016 A | * | 4/1998 | Barton et al. | 279/62 |
| 5,829,762 A | * | 11/1998 | Claramunt et al. | 279/62 |
| 5,934,690 A | * | 8/1999 | Lin | 279/62 |
| 6,173,972 B1 | * | 1/2001 | Temple-Wilson et al. | 279/62 |
| 6,848,691 B2 | | 2/2005 | Yang et al. | |
| 2003/0006567 A1 | * | 1/2003 | Steadings et al. | 279/62 |

FOREIGN PATENT DOCUMENTS

| | | |
|---|---|---|
| CN | 2582790 | 10/2003 |
| CN | 1562541 | 1/2005 |
| CN | 2723084 | 9/2005 |
| EP | 1 314 499 | 8/2002 |
| EP | 1559491 A1 * | 8/2005 |
| FR | 2857284 A1 * | 1/2005 |

* cited by examiner

*Primary Examiner* — Daniel Howell
*Assistant Examiner* — Paul M Janeski
(74) *Attorney, Agent, or Firm* — Merchant & Gould P.C.

(57) ABSTRACT

The present invention publicly discloses a self-locking mechanism of a manually tightened drill chuck, including a ratchet wheel, a clamp bearing, at least one resilient pawl, and a clip ring, wherein said ratchet wheel is fixed in connection with the main unit of said manually tightened drill chuck, and on its back there are provided ratchet teeth facing the end surface of said main unit; said clamp bearing is fixed in connection with the outside surface of a screw ring on said manually tightened drill chuck, and the end surface of this clamp bearing is provided with at least one ratchet wheel slot; said resilient pawl is fixed on said ratchet wheel slot, and it includes a protuberance and a tooth piece; and said clip ring includes at least two arc segments that can mutually antagonistically snap onto the front end position of said main unit, the outer perimeter surface of this clip ring is fixed in connection with a front cap of said manually tightened drill chuck, said clip ring is connected with said clamp bearing and drives said clamp bearing to rotate, and the end surface of said clip ring is provided with deep and shallow recesses for receiving the protuberance on said resilient pawl.

9 Claims, 5 Drawing Sheets

SELF-LOCKING MECHANISM OF MANUALLY TIGHTENED DRILL CHUCK

FIELD OF TECHNOLOGY

The present invention relates to an area of mechanical technology, and more concretely, it relates to a self-locking mechanism of a manually tightened drill chuck.

BACKGROUND TECHNOLOGY

A manually tightened drill chuck is a commonly used tool in daily life, and mainly it is used for boring and drilling holes when installing or fixing articles. If a manually tightened drill chuck is not provided with a self-locking mechanism, as shown in FIG. 1, the drill's forceful vibrations in the course of use can easily cause the drill bit on the front end to loosen, affecting the bore quality, or, in severe cases, to break, which is dangerous.

SUMMARY OF THE INVENTION

The purpose of the present invention is to provide a self-locking mechanism of a manually tightened drill chuck that will prevent the drill bit of the manually tightened drill chuck from loosening and breaking in the course of use.

The self-locking mechanism of a manually tightened drill chuck of the present invention includes a ratchet wheel, a clamp bearing, at least one resilient pawl, and a clip ring, wherein:

said ratchet wheel is fixed in connection with a main unit of said manually tightened drill chuck, and on its back there are provided ratchet teeth facing the end surface of said main unit;

said clamp bearing is fixed in connection with the outside surface of a screw ring on said manually tightened drill chuck, and the end surface of this clamp bearing is provided with at least one ratchet wheel slot;

said resilient pawl is fixed on said ratchet wheel slot, and it includes a protuberance and a tooth piece; and said clip ring includes at least two arc segments that can mutually antagonistically snap onto the front end position of said main unit, the outer perimeter surface of this clip ring is fixed in connection with a front cap of said manually tightened drill chuck, said clip ring is connected with said clamp bearing and drives said clamp bearing to rotate, and the end surface of said clip ring is provided with deep and shallow recesses for receiving the protuberance on said resilient pawl.

The end surface of said clip ring is provided with at least one protuberance, and the end surface of said clamp bearing is provided with a recess corresponding with this protuberance and having a width larger than the protuberance.

The end surface of said clip ring is provided with at least one recess, and the end surface of said clamp bearing is provided with a protuberance corresponding with this recess and having a width smaller than the recess.

Said ratchet wheel is integrally formed with said main unit, and said ratchet teeth are directly formed on the end surface of said main unit.

The outer perimeter surface of said clip ring is tight-fitted with said front cap by means of a raised rib and a recess.

The inner perimeter surface of said clamp bearing is tight-fitted with the outer perimeter surface of said screw ring by means of a raised rib and a recess.

Said ratchet teeth are replaced by recesses, pits or holes.

A manually tightened drill chuck, including a self-locking mechanism described above.

The manually tightened drill chuck of the present invention can realize the purpose of self-locking after installing the self-locking mechanism, and it has the advantages of convenience of installation, simplicity of operation, and self-locking effectiveness.

SPECIFIC EMBODIMENTS

Figure 1:
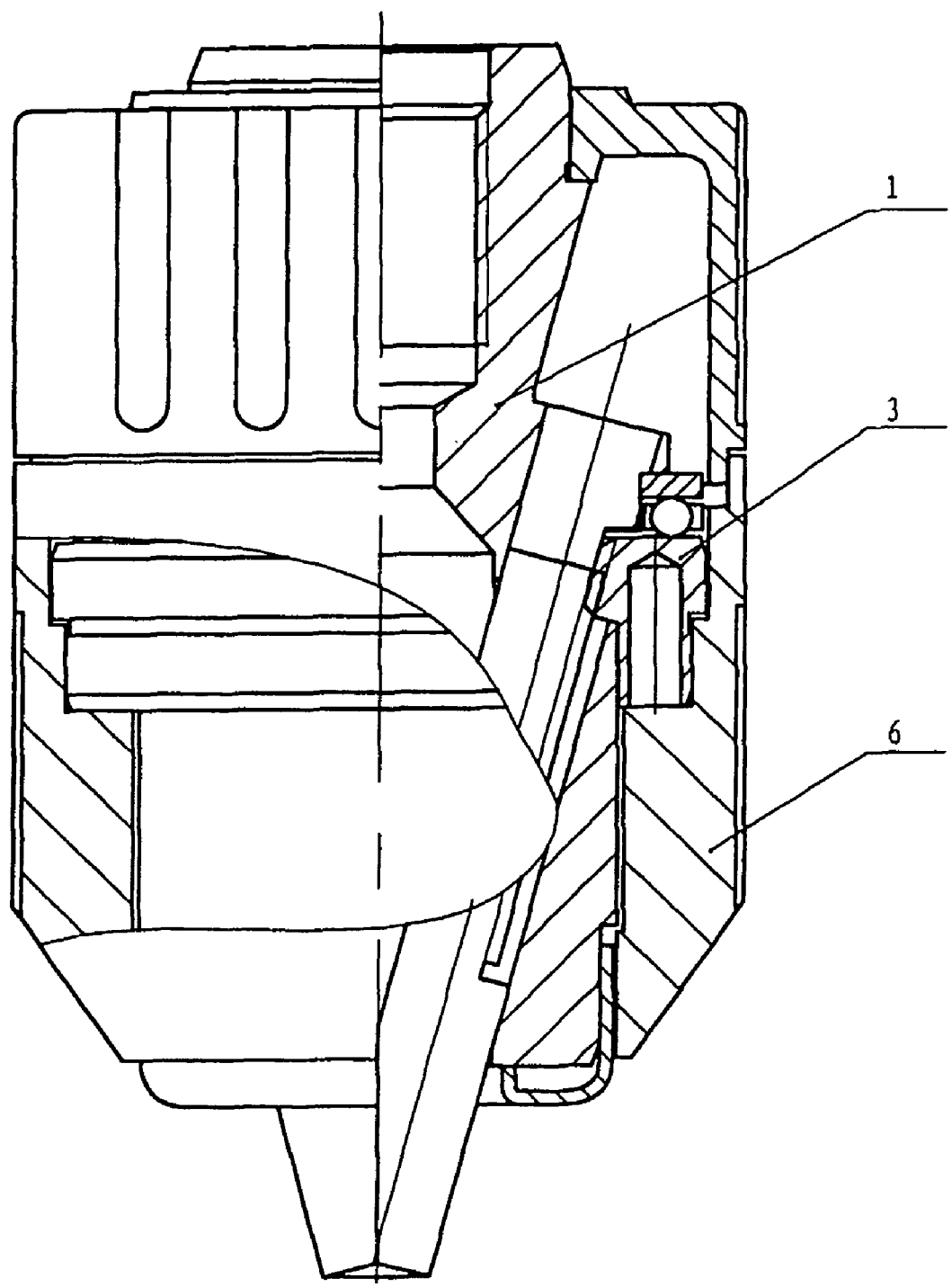
FIG. 1 is a schematic in sectional view of a manually tightened drill chuck when the self-locking mechanism of the present invention has not yet been installed.

Specific embodiments of the present invention are explained in further detail below along with the attached drawings.

Embodiment 1

As shown in FIG. 2 through FIG. 5, the self-locking mechanism of a manually tightened drill chuck of the present invention includes a ratchet wheel 2, a clamp bearing 4, two resilient pawls 5, and a clip ring 7, wherein:

the ratchet wheel 2 is fixed on the end part of the inner cavity of the manually tightened drill chuck main unit 1 by means of a connecting member, such as a screw, screw bolt or nut screw (not illustrated in the drawings) or a tight fitting, and furthermore on its back there are provided ratchet teeth 20 facing the end surface of the manually tightened drill chuck main unit 1.

The clamp bearing 4 is directly fixed on the outer perimeter surface of a screw ring 3 of the manually tightened drill chuck, and one can connect the clamp bearing 4 and the outer perimeter surface of the screw ring 3 by using a tight-fitting or connecting member (one can also place raised ribs, protuberances, recesses, pits, holes, hooking mechanisms, etc., that mutually snap together between the clamp bearing 4 and the perimeter surface of the screw ring 3). That is, the clamp bearing 4 and the screw ring 3 rotate together. The outside edge of the end surface of this clamp bearing 4 is provided with two recesses 40 and two pawl slots 41 (the number of recesses and pawl slots can be changed according to different requirements).

The two resilient pawls 5 respectively are installed on the two pawl slots 41 of the clamp bearing 4, and each resilient pawl 5 includes a protuberance 50 and an uplifted tooth piece 52. The shapes of these resilient pawls 5 can be all kinds of shapes other than those illustrated in the drawings, and one can use all kinds of connecting methods such as welding, riveting, and adhesion to fix these to the clamp bearing 4.

The clip ring 7 includes two semicircular arc segments that can mutually antagonistically snap onto the front end position of the manually tightened drill chuck (simply called two-piece clip ring), and after being snapped onto the front end position of the drill chuck, they cannot move in the axial line direction, but they can rotate freely in the radial direction. The outer perimeter surface of this clip ring 7 is tight-fitted with a front cap 6 of the manually tightened drill chuck, and on its end surface there are provided protuberances 70 that can correspondingly fit with the recesses 40 of the clamp bearing 4. At the same time, there are provided deep and narrow alternating recesses 71, 72 that can receive the resilient pawls 5, of which the width of the protuberances 70 is smaller than the width of the recesses 40, so as to enable the clip ring 7 to rotate a fixed angle, given that the clamp bearing 4 does not rotate.

Figure 2:
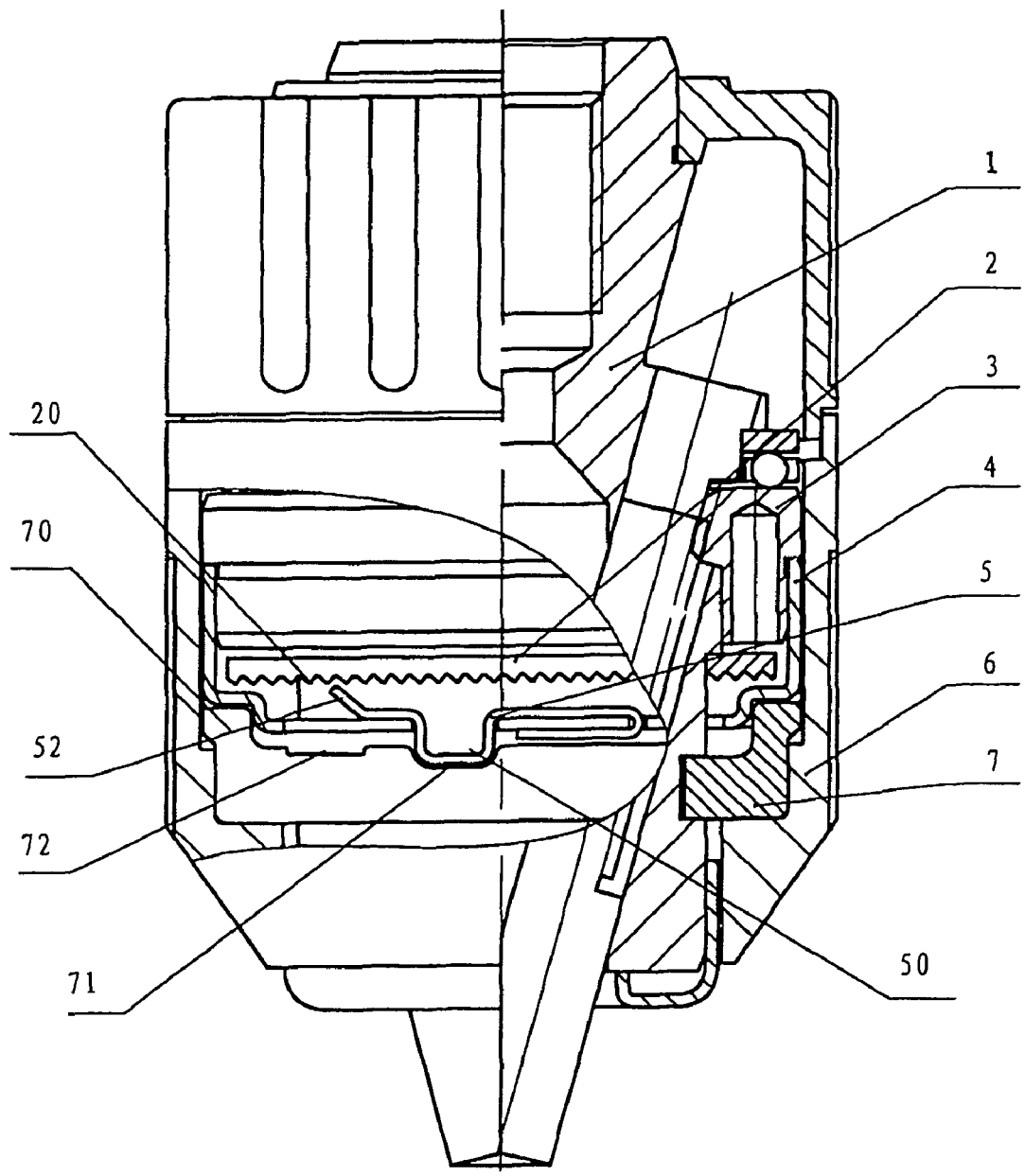
FIG. 2 is a schematic in sectional view of a manually tightened drill chuck after the self-locking mechanism of the present invention has been installed.
Figure 3:
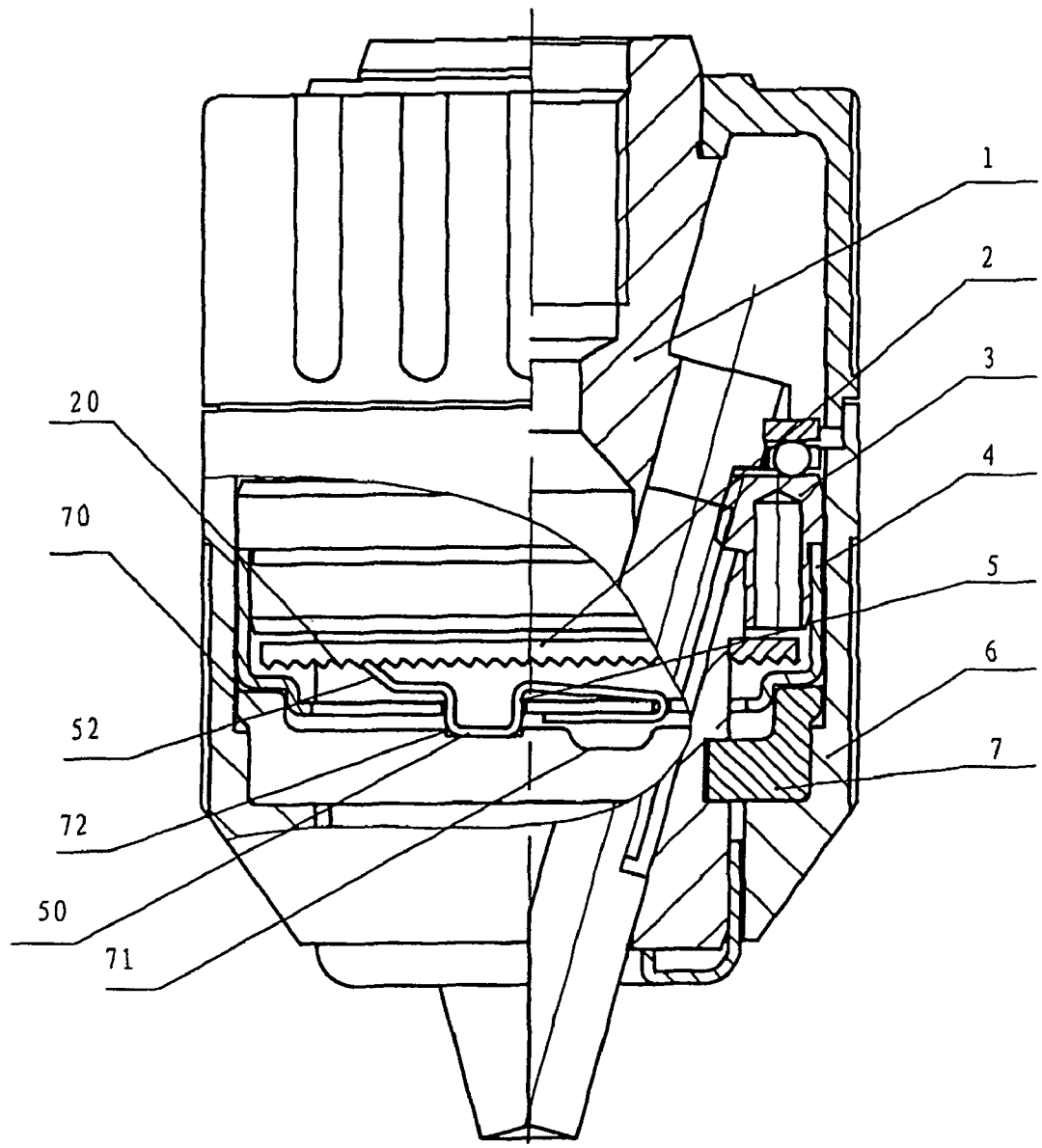
FIG. 3 is a schematic in sectional view when the self-locking mechanism of the present invention is installed and is in the locked state.
Figure 4:
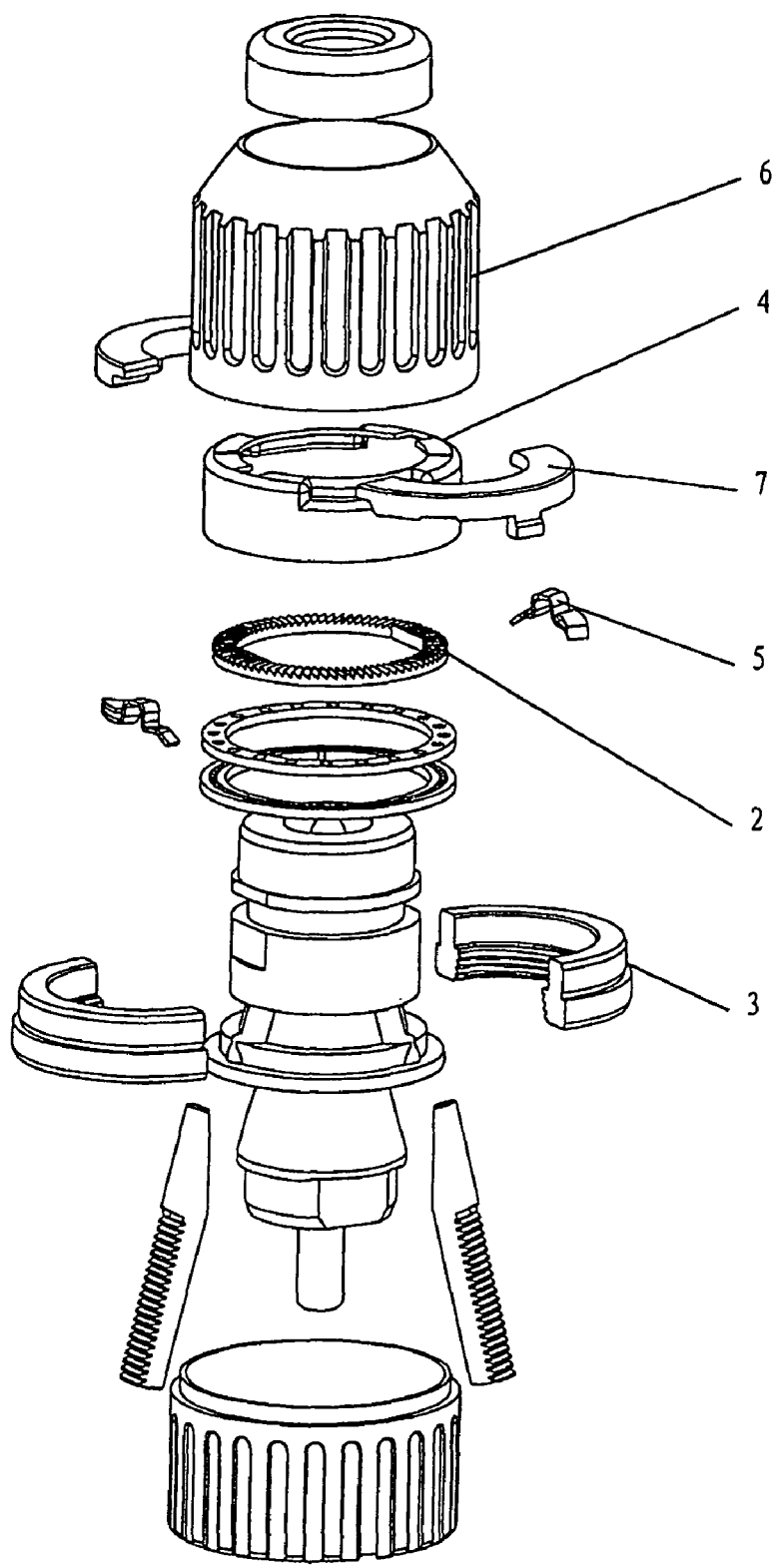
FIG. 4 is a three-dimensional exploded view of a manually tightened drill chuck with the self-locking mechanism of the present invention installed.
Figure 5:
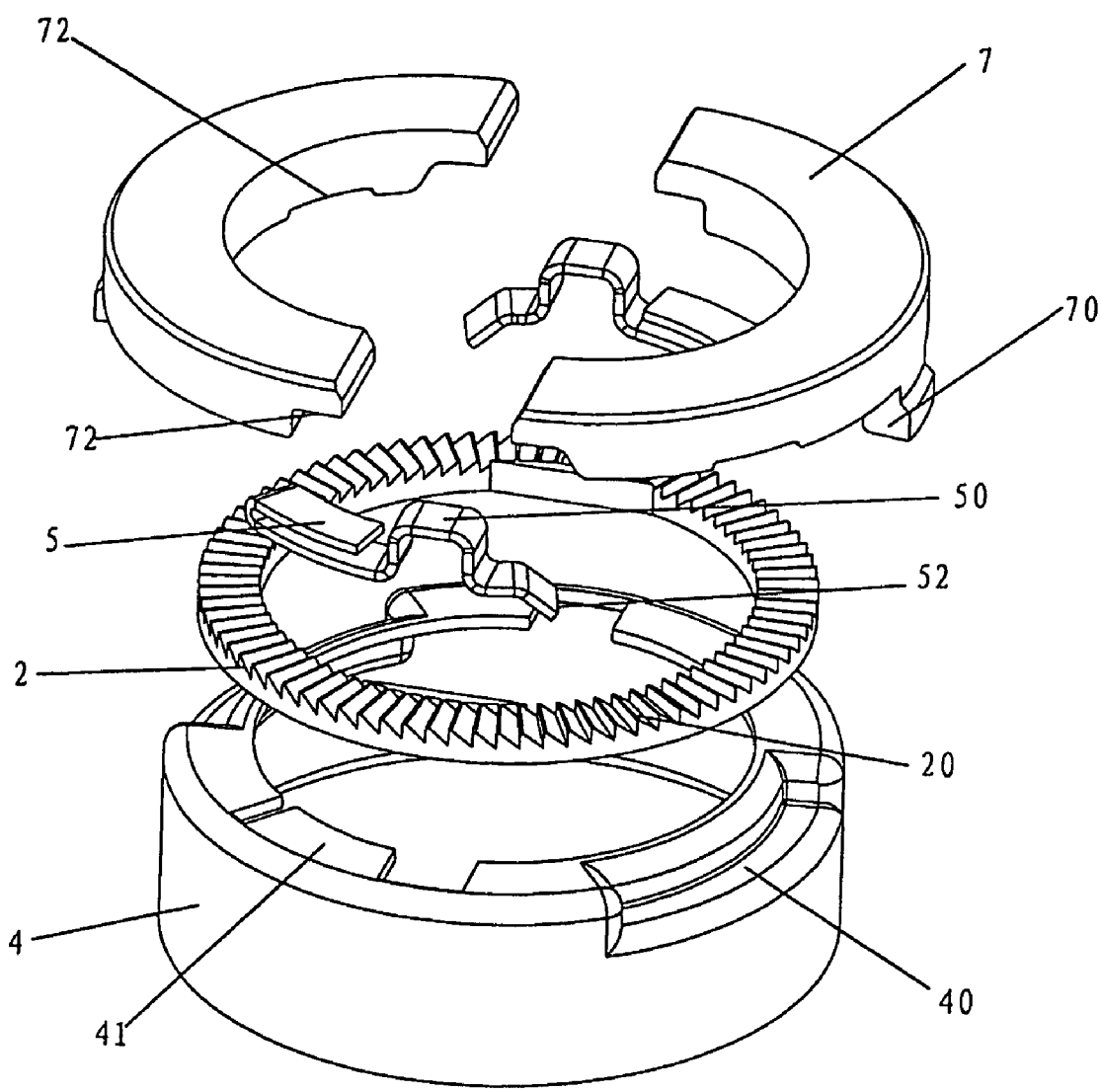
FIG. 5 is a three-dimensional exploded view of the self-locking mechanism of the present invention.

The principle of operation of the self-locking mechanism in the present invention is:

As shown in FIG. 2 and FIG. 3, during installation the deep recesses 71 on the end surface of the two-piece clip ring 7 are aligned with the protuberances 50 of the resilient pawls 5, and the protuberances 70 on the end surface of the clip ring 7 are aligned with the recesses 40 on the end surface of the clamp bearing 4. When work with the manually tightened drill chuck requires locking of the drill bit, one turns the front cap 6 to drive the two-piece clip ring 7 to rotate. At this time, since the protuberances 50 of the resilient pawls 5 are in the deep recesses 71 on the end surface of the two-piece clip ring 7, there is a fixed resilient resistance acting against the two-piece clip ring 7 as it rotates past a fixed angle while the protuberances 70 on the clip ring 7 rotate the clamp bearing 4 (the resilient pawls 5 can not yet be pressed down by the two-piece clip ring 7). But when the clip ring 7 drives the clamp bearing 4 to rotate, it furthermore drives the screw ring 3 to rotate until it takes part in tightening the drill bit. One continues to turn the front cap 6, and at this time, the clamp bearing 4 is subject to resistance and cannot rotate, and the front cap 6 continues to drive the two-piece clip ring 7, forcing it to rotate through a fixed angle, while correspondingly compelling the protuberances 50 of the resilient pawls 5 mounted on the clamp bearing 4 to move along the deep recesses 71 on the end surface of the two-piece clip ring 7 to the shallow recesses 72, causing the protuberances 50 of the resilient pawls 5 to be moved in position into the shallow recesses 72 of the clip ring 7, causing the resilient pawls 5 to move up, as shown in FIG. 2 and FIG. 3. Thus, it causes the tooth pieces 52 of the resilient pawls 5 to click into the ratchet teeth 20 of the ratchet 2, as shown in FIG. 3. Since the ratchet teeth 20 on the ratchet wheel 2 are placed facing one direction, the screw ring 3 can only rotate toward one direction, and at this time, one continues to turn the front cap 6 and clip ring 7 until the protuberances 50 of the resilient pawls 5 move to the ends of the shallow recesses 72 of the clip ring 7 and realize the purpose of self-locking. When it is necessary to loosen the drill bit, one turns round the front cap 6 and drives the clip ring 7 causing the two-piece clip ring 7 first to turn past the angle it was forced to rotate past when tightening, and at this time, the resilient pawls 5 return to the position in the deep recesses 71 of the clip ring 7, and the tooth pieces 52 of the resilient pawls 5 separate from the ratchet teeth 20. Continuing to turn the front cap 6 will drive the clamp bearing 4 to rotate with the screw ring 3 until the drill bit is loosened.

Embodiment 2

The self-locking mechanism of the present embodiment is basically the same as in embodiment 1 described above, and the only difference is that the self-locking mechanism of the present embodiment is provided with a ratchet wheel 2, but it has ratchet teeth 20 directly placed on the end surface of the inner cavity of the manually tightened drill chuck main unit 1. Also these ratchet teeth 20 can be replaced by protuberances, depressions, holes, pits, etc., realizing the purpose of self-locking in just the same way.

In addition, the clip ring 7 in the self-locking mechanism of the present invention can be composed of three, four, or more arc segments that can mutually antagonistically snap together as one body. Also the outer perimeter surface of this clip ring 7 is provided with a structure that can be mutually fitted and fixed with the front cap, such as protuberances, raised ribs, recesses, holes, or pits.

In addition, one point is emphasized here, that the recesses 40 and protuberances 70 on the clamp bearing 4 and the clip ring 7 in Embodiment 1 described above can be swapped, that is, the protuberances are placed on the clamp bearing 4 and the recesses are placed on the clip ring 7, and all that is necessary is to make the clip ring 7 and the clamp bearing 4 again rotate together after having a relative angle of rotation.

To sum up the above, the self-locking mechanism of the present invention can achieve the purpose of self-locking after being installed on the manually tightened drill chuck, and it is easy to use and safe and reliable.

The invention claimed is:

1. A self-locking mechanism of a manually tightened drill chuck, comprising a ratchet wheel, a clamp bearing, at least one resilient pawl, and a clip ring wherein:

said ratchet wheel is fixed in connection with a main unit of said manually tightened drill chuck, and on its back there are provided ratchet teeth facing the end surface of said main unit;

said clamp bearing is fixed in connection with the outside surface of a screw ring on said manually tightened drill chuck, and the end surface of this clamp bearing is provided with at least one ratchet wheel slot;

said resilient pawl is fixed on said ratchet wheel slot, and it includes a protuberance and a tooth piece; and said clip ring includes at least two arc segments that can mutually antagonistically snap onto the front end position of said main unit, the outer perimeter surface of this clip ring is fixed in connection with a front cap of said manually tightened drill chuck, said clip ring is connected with said clamp bearing and drives said clamp bearing to rotate, and the end surface of said clip ring is provided with deep and shallow recesses for receiving the protuberance on said resilient pawl.

2. A self-locking mechanism of a manually tightened drill chuck as described in claim 1, wherein the end surface of said clip ring is provided with at least one protuberance, and the end surface of said clamp bearing is provided with a recess corresponding with this protuberance and having a width larger than the protuberance.

3. A self-locking mechanism of a manually tightened drill chuck as described in claim 1, wherein the end surface of said clip ring is provided with at least one recess, and the end surface of said clamp bearing is provided with a protuberance corresponding with this recess and having a width smaller than the recess [sic].

4. A self-locking mechanism of a manually tightened drill chuck as described in 1, wherein said ratchet wheel is integrally formed with said main unit, and said ratchet teeth are directly formed on the end surface of said main unit.

5. A self-locking mechanism of a manually tightened drill chuck as described in claim 1, wherein the outer perimeter surface of said clip ring is tight-fitted with said front cap by means of a raised rib and a recess.

6. A self-locking mechanism of a manually tightened drill chuck as described in claim 1, wherein the inner perimeter surface of said clamp bearing is tight-fitted with the outer perimeter surface of said screw ring by means of a raised rib and a recess.

7. A self-locking mechanism of a manually tightened drill chuck as described in claim 1, wherein said ratchet teeth are substituted by recesses, pits or holes.

8. A self-locking mechanism of a manually tightened drill chuck as described in claim 1, said resilient pawl is fixed in connection with said clamp bearing by welding, riveting or adhesion method.

9. A manually tightened drill chuck, comprising:
a chuck body;
means for securing a drill bit to the chuck body, the securing means being configurable in at least a first and second states, wherein the drill bit is secured to the chuck body when the securing means is configured in the first state, and is released from the chuck body when the securing means in configured in the second state; and
means for locking the securing means in the first state.

* * * * *